US010109307B2

(12) United States Patent
Tokiwa et al.

(10) Patent No.: US 10,109,307 B2
(45) Date of Patent: Oct. 23, 2018

(54) HALF-FINISHED HEAD SUSPENSION

(71) Applicant: NHK SPRING CO., LTD., Yokohama-shi, Kanagawa (JP)

(72) Inventors: Tadashi Tokiwa, Kanagawa (JP); Naoki Moriya, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 14/950,631

(22) Filed: Nov. 24, 2015

(65) Prior Publication Data

US 2016/0078886 A1 Mar. 17, 2016

Related U.S. Application Data

(62) Division of application No. 13/569,903, filed on Aug. 8, 2012, now Pat. No. 9,230,581.

(30) Foreign Application Priority Data

Sep. 6, 2011 (JP) .................................. 2011-194354

(51) Int. Cl.
*G11B 5/48* (2006.01)

(52) U.S. Cl.
CPC .......... *G11B 5/4833* (2013.01); *G11B 5/4826* (2013.01); *Y10T 29/49021* (2015.01)

(58) Field of Classification Search
CPC .......... G11B 5/4806–5/4873; Y10T 29/49021
See application file for complete search history.

(56) References Cited

U.S. PATENT DOCUMENTS

| 5,491,597 | A * | 2/1996 | Bennin | G11B 5/4833 360/234.5 |
| 6,367,144 | B1 * | 4/2002 | Holaway | G11B 5/4826 269/48 |
| 6,837,092 | B1 | 1/2005 | Ubl et al. | |
| 7,650,685 | B2 * | 1/2010 | Tada | G11B 5/4833 29/603.03 |
| 7,661,189 | B2 | 2/2010 | Shindo et al. | |
| 8,008,601 | B2 | 8/2011 | Ushimaru et al. | |
| 2002/0171981 | A1 * | 11/2002 | Wada | G11B 5/486 360/244.1 |
| 2008/0049360 | A1 * | 2/2008 | Fujiwara | G11B 5/4826 360/244.5 |

* cited by examiner

*Primary Examiner* — Livius R Cazan

(74) *Attorney, Agent, or Firm* — Norris McLaughlin, P.A.

(57) ABSTRACT

A positioning method positions a flexure whose front end side is joined to an outside frame with respect to a load beam, keeps the positioned state of the flexure and load beam, plastically deforms the outside frame to bend the front end side of the flexure so that the position of a tongue of the flexure is adjusted to the position of a dimple of the load beam, and joins the flexure and load beam to each other to keep the position adjusted state of the tongue.

4 Claims, 6 Drawing Sheets

HALF-FINISHED HEAD SUSPENSION

REFERENCE TO RELATED APPLICATION

This is a divisional application of Ser. No. 13/569,903, filed Aug. 8, 2012, now U.S. Pat. No. 9,230,581. The subject matter of the aforementioned prior application is hereby incorporated herein by reference.

BACKGROUND OF THE INVENTION

1. Field of the Invention

The present invention relates to a method of positioning a head attaching part of a flexure of a head suspension relative to a supporting part of a load beam of the head suspension, a method of manufacturing a half-finished head suspension, and a half-finished head suspension.

2. Description of Related Art

A head suspension supports a read/write head to write and read data to and from a hard disk in a hard disk drive. The head suspension includes a load beam and a flexure. The load beam applies load onto the read/write head at a front end thereof. The flexure is laid on and joined to the load beam, to support the flexure.

The flexure has a conductor pattern that is connected to the head. At a front end, the flexure has a tongue serving as a head attaching part on which pads (electrodes) of the conductor pattern are arranged. The tongue has a front face to which the head is attached and a back face that is in contact with and is supported with a dimple as a supporting part formed on the load beam.

In a hard disk drive, the head of the head suspension slightly floats from a hard disk when the hard disk is rotated at high speed, to write and read data to and from the hard disk. At this time, the head swings around the dimple, to stabilize the attitude of itself.

To surely stabilize the attitude, the head must precisely be positioned relative to the dimple. The requirement for the head positioning preciseness is becoming severer as requirements for higher speed, higher capacity hard disk drives are increasing.

To meet the requirements, JP2010-40116A discloses a technique of correctly positioning the tongue, i.e., the head attaching part of a flexure relative to the dimple of a load beam.

This related art forms a reference hole in each of the flexure and load beam and inserts a positioning pin into the reference holes. The reference hole on the flexure is defined with a conductor layer portion of the flexure. The conductor layer portion, is formed together with a conductor pattern in the same layer.

The related art positions the flexure and load beam relative to each other with the use of the reference holes and positioning pin, thereby positioning the conductor pattern and dimple with respect to each other. With this, the related art correctly positions the tongue relative to the dimple in accordance with a head attaching position decided on the head attaching part based on positions of pads of the conductor pattern.

The related art, however, has a problem that the reference hole of the flexure defined with the conductor layer easily deforms because the conductor layer is made of soft material such as copper. If the reference hole deforms, it is impossible to precisely position the tongue with respect to the dimple.

In addition, the related art must prepare a clearance between the reference holes and the positioning pin and such a clearance deteriorates the positioning accuracy of the tongue with respect to the dimple.

SUMMARY OF THE INVENTION

An object of the present invention is to provide a method of correctly positioning a head attaching part of a flexure with respect to a supporting part of a load beam. Another object of the present invention is to provide a method of manufacturing a half-finished head suspension with the positioning method. Still another object of the present invention is to provide a half-finished head suspension made by the manufacturing method.

In order to accomplish the objects, an aspect of the present invention provides a method of positioning a head attaching part defined at a front end side of a flexure for attaching a read/write head with respect to a supporting part of a load beam when the flexure and the load beam are laid on and joined to each other on an outside frame to which the front end side of the flexure is joined. The method includes steps of positioning the flexure with respect to the load beam and keeping the positioned state of the flexure and load beam, plastically deforming the outside frame to bend the front end side of the flexure so that the position of the head attaching part of the flexure is adjusted to the position of the supporting part of the load beam, and joining the position-adjusted flexure and load beam to each other to keep the position adjusted state of the head attaching part.

This aspect of the present invention adjusts the position of the head attaching past of the flexure by very small quantities that are unable to adjust by simply positioning the flexure relative to the load beam.

DETAILED DESCRIPTION OF EMBODIMENTS

Embodiments of the present invention will be explained. Each embodiment positions a flexure with respect to a load beam and plastically deforms an outside frame integral with the flexure, thereby precisely positioning a head attaching part of the flexure with respect to a supporting part of the load beam.

The outside frame preferably includes a flexure frame that is joined to a front end side of the flexure and a beam frame that is joined to the load beam.

After the flexure is laid on the load beam and is positioned with respect to the load beam, the flexure frame and beam frame are fixed to each other at spots in an area where the flexure frame and beam frame overlap each other. In this state, at least one of the flexure frame and beam frame is plastically deformed to correctly position the head attaching part of the flexure with respect to the supporting part of the load beam.

The plastic deformation is preferably carried out with laser beams. Instead, an actuator such as a piezoelectric element or a linear motor may be used to directly apply force to the outside frame and plastically deform the outside frame.

A first embodiment will be explained in detail with reference to drawings.

Figure 1:
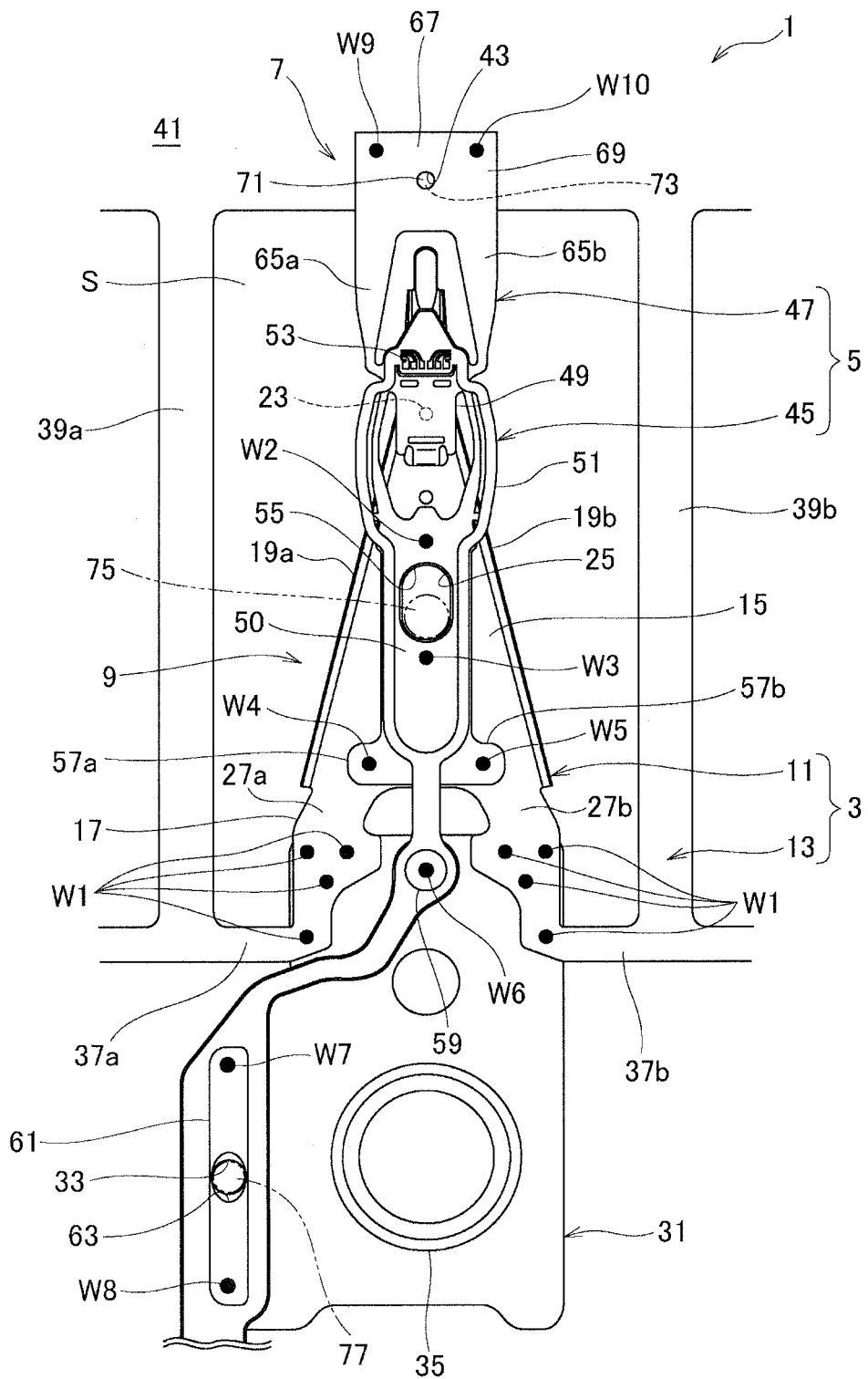
FIG. 1 is a plan view illustrating a half-finished head suspension obtained from a positioning method according to a first embodiment of the present invention.

FIG. 1 is a plan view illustrating a half-finished head suspension obtained according to a positioning method.

A half-finished head suspension (hereinafter referred to as the "framed suspension") 1 includes a half-finished load beam (hereinafter referred to as the "framed beam") 3 and a half-finished flexure (hereinafter referred to as the "framed flexure") 5. The framed beam 3 and framed flexure 5 are laid on one another and joined together to form the framed suspension 1 having a head suspension 9 supported with an outside frame 7. The outside frame 7 is removed from the framed suspension 1 and a magnetic head slider, i.e., a read/write head (not illustrated) is attached to a head attaching part of the flexure, thereby completing the head suspension 9.

In practice, the framed suspension 1 includes plural head suspension 9 supported with the outside frame 7. For the sake of clarity, the outside frame 7 supports only one head suspension 9 as illustrated in FIG. 1.

The framed beam 3 includes a load beam 11 and a beam frame 13.

The load beam 11 is to apply load onto a slider to be attached to the head attaching part of the flexure and includes a rigid part 15 and a resilient part 17.

The rigid part 15 is made of a metal thin plate such as a stainless steel thin plate. The rigid part 15 have bends 19a and 19b on both lateral sides to improve rigidity. A front end of the rigid part 15 has a dimple 23 serving as a supporting part to support the head attaching part of the flexure. An intermediate part of the rigid part 15 has a reference hole 25 and a base end of the rigid part 15 is integral with the resilient part 17.

The resilient part 17 has a pair of legs 27a and 27b. An area from an intermediate part of the resilient part 17 to a base end of the resilient part 17 that is a base end of the load beam 11 is laid on and fixed to a base plate 31 by laser welding at spots W1, In FIG. 1, four welding spots W1 are formed on respective legs 27a and 27b.

The base plate 31 is made of a metal thin plate such as a stainless steel thin plate. In the vicinity of a side edge of the base plate 31, there is a reference hole 33. At a central part of the base plate 31, there is a circular boss 35. With the boss 35, the base plate 31 is fitted to a carriage (not illustrated) that is turned by a voice coil motor (not illustrated).

The beam frame 13 is integral with the resilient part 17 of the load beam 11, and like the load beam 11, is made of a metal thin plate such as a stainless steel thin plate. The beam frame 13 includes beam frame bases 37a and 37b, beam frame sides 39a and 39b, and a beam frame front 41.

The beam frame bases 37a and 37b extend front the legs 27a and 27b of the resilient part 17 in a width direction of the load beam 11 and are integral with the beam frame sides 39a and 39b. The beam frame sides 39a and 39b longitudinally extend along the load beam 11 on both sides and are integral with the beam frame front 41. The beam frame front 41 opposes a front end of the load beam 11 and has a reference hole 43.

The beam frame bases 37a and 37b, beam frame sides 39a and 39b, and beam frame front 41 of the beam frame 13 define a space S in which the load beam 11 is positioned.

The framed flexure 5 includes the flexure 45 and a flexure frame 47.

The flexure 45 includes a conductive base plate 50, an insulating layer formed on the conductive base plate 50, and a conductor pattern 51 formed on the insulating layer. The conductive base plate 50 is made of, for example, thin stainless steel rolled plate having flexibility (resiliency).

The flexure 45 extends from the base plate 31 up to a front end of the load beam 11 and is joined to the base plate 31 and load beam 11 by laser welding at spots W2. to W8.

A front end of the flexure 45 has a cantilever tongue 49 to which a slider is attached. The tongue 49 is the head attaching part that is supported with the supporting part, i.e., the dimple 23 of the load beam 11. A front face of the tongue 49 has a pad (electrode) 53 connected to the conductor pattern 51 at a base of the cantilevered shape. A back face of the tongue 49 is in contact with and supported with the dimple 23 of the load beam 11.

At an intermediate part of the flexure 45, there is a reference hole 55 corresponding to the reference hole 25 of the rigid part 15 of the load beam 11. The reference hole 55 is defined with the conductive base plate 50 of the flexure 45. On each side of the reference hole 55 in a longitudinal direction, there are the welding spots W2 and W3.

At an intermediate part of the flexure 45, there are projections 57a and 57b at locations corresponding to a base end of the rigid part 15. On the projections 57a and 57b, there are the welding spots W4 and W5.

The flexure 45 has an intermediate exposed part 59 at a location corresponding to an end of the base plate 31 between the legs 27a and 27b of the resilient part 17 of the load beam 11. The intermediate exposed part 59 is surrounded with the conductor pattern 51 and exposes the conductive base plate 50. In the intermediate exposed part 59, there is the welding spot W6.

On the base plate 31, the flexure 45 has an end laterally shifted to extend along a side edge of the base plate 31. The end of the flexure 45 has an end exposed part 61 surrounded with the conductor pattern 51. The end exposed part 61 has a reference hole 63 corresponding to the reference hole 33 of the base plate 31. On each side of the reference hole 63 in a longitudinal direction, there are the welding spots W7 and W8.

The flexure frame 47 forms the outside frame 7 together with the beam frame 13. The flexure frame 47 is integral with a front end side of the flexure 45 and includes a pair of flexure frame arms 65a and 65b and a flexure frame body 67.

The flexure frame arms 65a and 65b are integral with the front end side of the flexure 45 on each side with respect to a longitudinal axial line of the flexure 45. The locations where the flexure frame arms 65a and 65b join the front end side of the flexure 45 correspond to the pad (electrode) 53 of the flexure 45. The flexure frame arms 65a and 65b extend along the flexure 45 and integrally join the flexure frame body 67.

The flexure frame body 67 opposes a front end of the flexure 45. An end of the flexure frame body 67 forms an overlapping area 69 that overlaps the beam frame front 41 of the beam frame 13. The overlapping area 69 has a reference hole 71 corresponding to the reference hole 43 of the beam frame 13. On each side of the reference hole 71 in a width direction, there are the welding spots W9 and W10 to join the flexure frame 47 and beam frame 13 to each other.

Figure 2:
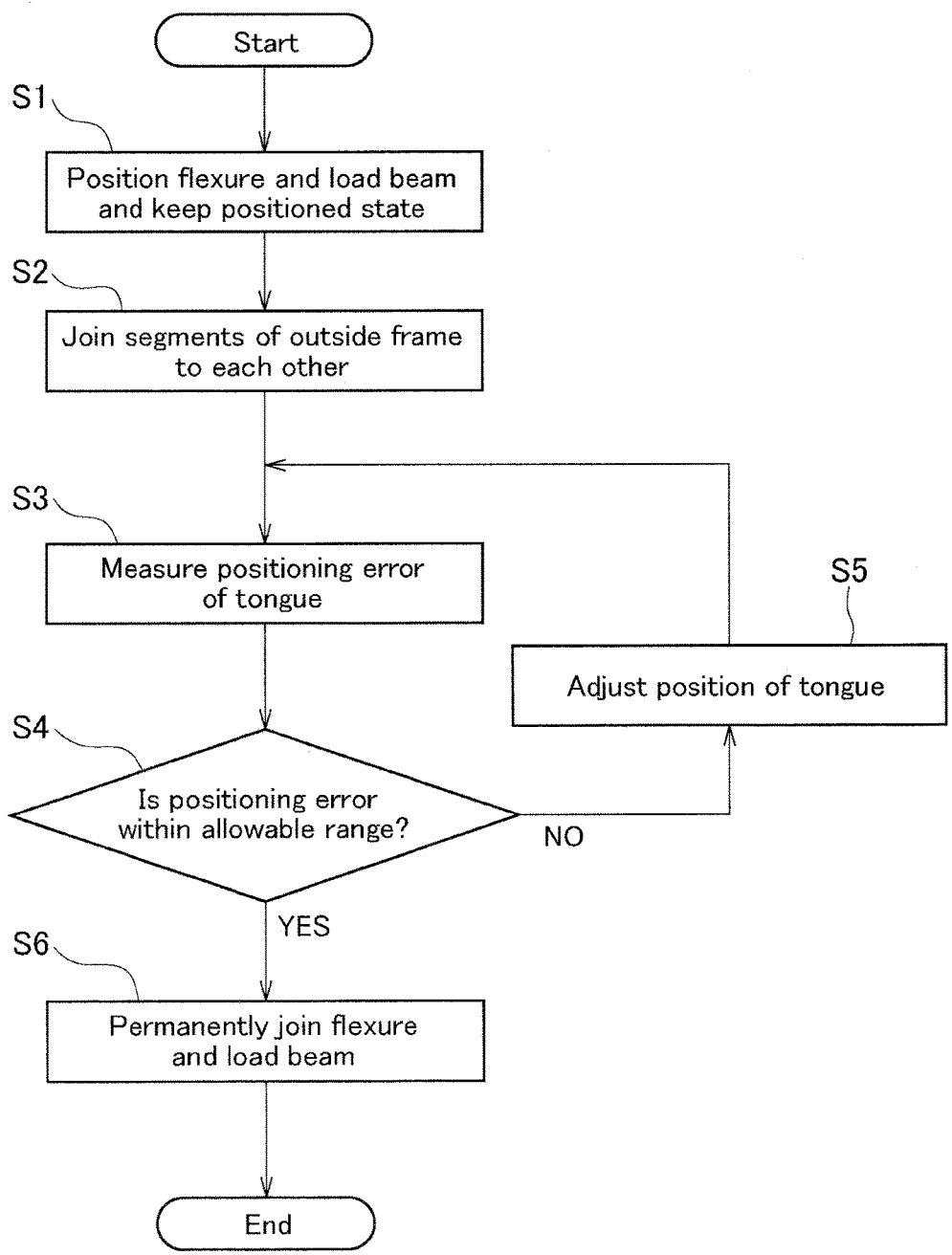
FIG. 2 is a flowchart illustrating the positioning method according to the first embodiment.
Figure 3:
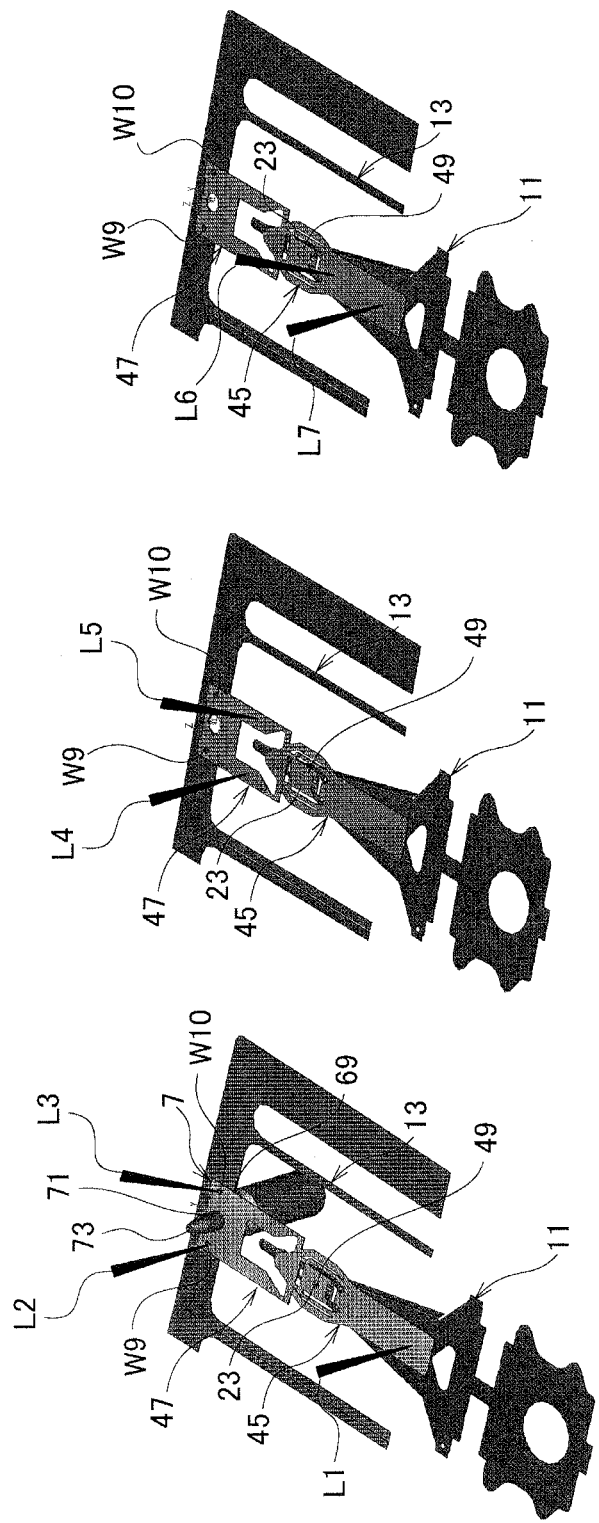
FIGS. 3A to 3C are schematic views illustrating the positioning method according to the first embodiment.

The positioning method according to the first embodiment will be explained with reference to FIGS. 1, 2, and 3A to 3C. FIG. 2 is a flowchart illustrating the positioning method and FIGS. 3A to 3C are schematic views illustrating the positioning method. Although the flexure 45 and load beam 11 are slightly differently illustrated between FIGS. 1 and 3, they are the same in structure.

The positioning method according to the first embodiment lays the flexure 45 on the load beam 11 and fixes the flexure 45 and load beam 11 to each other on the outside frame 7. At this time, the positioning method of the first embodiment is capable of precisely positioning the tongue 49 of the flexure 45 with respect to the dimple 23 of the load beam 11.

In FIG. 3A, the framed flexure 5 is laid on the framed beam 3. In this state, step S1 of FIG. 2 positions the flexure 45 with respect to the load beam 11 and keeps the positioned state.

Namely, step S1 inserts as illustrated in FIGS. 1 and 3A a positioning pin 73 into the reference holes 71 and 43 of the flexure frame 47 and beam frame 13, a positioning pin 75 into the reference holes 55 and 25 of the same, and a positioning pin 77 into the reference holes 63 and 33 of the same.

This positioning generally positions the flexure 45 with respect to the load beam 11. At this time, the tongue 49 of the flexure 45 is approximately positioned with respect to the dimple 23 of the load beam 11.

This positioned state is maintained by keeping the inserted state of the positioning pins 73, 75, and 77 and/or by temporarily joining the flexure 45 and load beam 11 to each other with a laser beam L1 as illustrated in FIG. 3A. In this embodiment, laser beams are emitted from a laser emitter (not shown) controlled by a controller (not shown).

The temporary joining may be carried out at any one of or a certain combination of the welding spots W4 to W8 (FIG. 1). The temporary joining is carried out at a location away from the front end side of the flexure 45 compared with the permanent welding spot W2 (explained later) closest to the tongue 49. Then, the positioning method transitions to step S2.

Step S2 joins segments of the outside frame 7 to each other with laser beams L2 and L3 as illustrated in FIG. 3A. Namely, step S2 welds the flexure frame 47 and beam frame 13 to each other at the welding spots W9 and W10 in the overlapping area 69.

The welding in the overlapping area 69 may be carried out when the flexure 45 and load beam 11 are temporarily joined together with the laser beam L1. Then, the positioning method transitions to step S3.

Step S3 measures a positioning accuracy or error between the dimple 23 of the load beam 11 and the tongue 49 of the flexure 45. Namely, step S3 measures a deviation of the tongue 49 relative to the dimple 23. The deviation, i.e., the positioning error is of several microns and is exhibited by clearances between the reference holes 43, 71, 25, 55, 33, and 63 and the positioning pins 73, 75, and 77, or a slider attaching position decided on the tongue 49 according to the position of the pad 53 of the flexure 45. This measurement is carried out with the use of an information processing apparatus such as a computer and a known image processing technique such as an image superimposing technique. Then, the positioning method transitions to step S4.

Step S4 determines whether or not the positioning error of the tongue 49 measured in step S3 is within an allowable range. If it is out of the allowable range, step S5 is carried out, and if it is within the allowable range, step S6 is carried out, Step S5 adjusts the position of the tongue 49 of the flexure 45 by plastically deforming the flexure frame 47 with laser beams L4 and L5 as illustrated in FIG. 3B.

Figure 4:
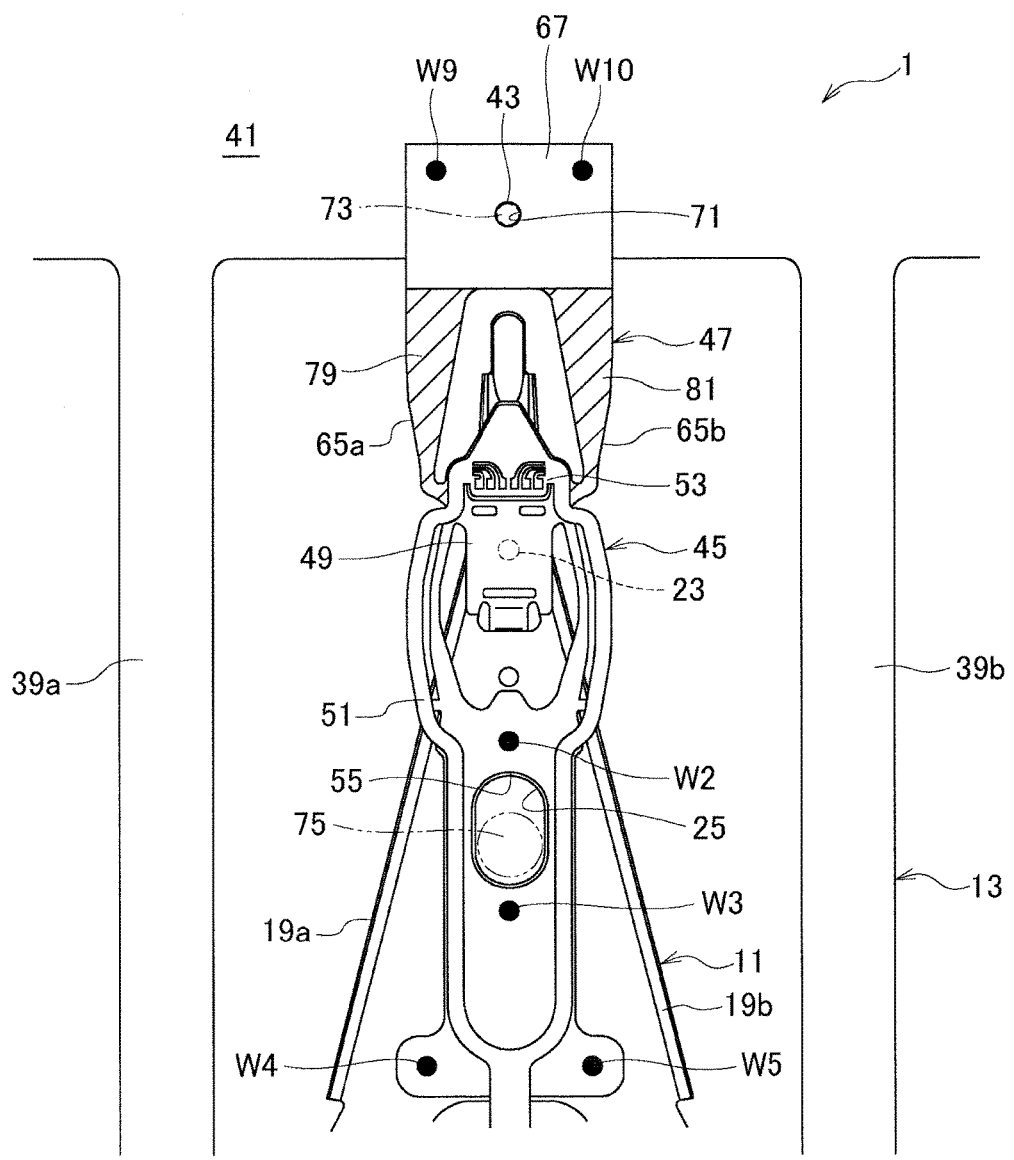
FIG. 4 is an enlarged view illustrating a deforming area of an outside frame of the half-finished head suspension illustrated in FIG. 1.

FIG. 4 is an enlarged view illustrating deforming areas defined on the flexure frame 47 of the outside frame 7.

In FIG. 4, the flexure frame 47 includes the deforming areas 79 and 81 depicted with hatches on the flexure frame arms 65a and 65b. When the laser beams L4 and L5 in FIG. 3B irradiate the deforming areas 79 and 81, the flexure frame arms 65a and 65b deform to pull the front end side of the flexure 45. As a result, the front end side of the flexure 45 bends so that the position of the tongue 49 is adjusted relative to the position of the dimple 23 of the load beam 11.

Although step S1 temporarily joins the flexure 45 and load beam 11 to each other, the temporary joined location is away from the front end side of the flexure 45 compared with the permanent welding spot W2, and therefore, the front end side of the flexure 45 is bendable with the laser beams L4 and L5 applied to the deforming areas 79 and 81, to precisely adjust the position of the tongue 49.

The quantity of the position adjustment carried out in step S5 is dependent on factors including laser beam irradiating locations in the deforming area 79 and 81 and the intensity of the laser beams L4 and L5. These factors may be listed in an adjustment table so that the table is referred to according to a measured positioning error when carrying out a position adjustment for correcting the positioning error.

After step S5, step S3 is again carried out to measure a positioning error of the tongue 49, These steps are repeated until the position of the tongue 49 comes within the allowable range.

Once step S4 determines that the position of the tongue 49 is within the allowable range, step S6 is carried out.

Step S6 permanently joins the flexure 45 and load beam 11 to each other with laser beams L6 and L7 as illustrated in FIG. 3C. More precisely, the flexure 45 and load beam 11 are welded together at the welding spots W2 to W5 (except W4 or W5 used for the temporary joining) of FIG. 1. At this time, the permanent welding is also carried out at the welding spots W4 to W8 if they are not used for the temporary welding or if no temporary welding is carried out.

The permanent welding maintains the position adjusted state of the tongue 49 of the flexure 45.

Through these steps, the first embodiment corrects a positioning error of several microns between the dimple 23 and the tongue 49 that is not adjustable by the related art or by only positioning the flexure 45 with respect to the load beam 11. On completion of the position adjustment of the tongue 49 of the flexure 45, production of the framed suspension (half-finished head suspension) 1 completes.

Effects of the first embodiment will be explained.

The positioning method according to the first embodiment, lays the flexure 45 whose front end side is joined to the outside frame 7 on the load beam 11, positions the flexure 45 relative to the load beam 11, keeps the positioned state (positioning step), plastically deforms the outside frame 7 to bend the front end side of the flexure 45 and correctly adjust the position of the tongue 49 of the flexure 45 with respect to the dimple 23 of the load beam 11 (plastically deforming step), joins the load beam 11 and flexure 45 together, and maintains the position-adjusted state of the tongue 49 (joining step).

The first embodiment is capable of precisely adjusting the position of the tongue 49 with respect to the dimple 23 and improving a positioning accuracy of the tongue 49 that are unachievable by the related art or by simply positioning the flexure 45 relative to the load beam 11.

When the load beam 11 and flexure 45 are positioned relative to each other, there will be a positioning error of several microns due to clearances between the reference holes 43, 71, 25, 55, 33, and 63 and the positioning pins 73, 75, and 77, or an error in a slider attaching position that is dependent on the position of the pad 53. The first embodiment is capable of correcting such a positioning error of several microns.

The first embodiment plastically deforms the outside frame 7 that is discarded when finishing the head suspension 9. Namely, the first embodiment carries out no position adjusting process directly on the head suspension 9, thereby suppressing variation in the dynamic characteristics of the head suspension 9.

The first embodiment easily carries out the plastic deformation of the outside frame 7 by using laser beams.

According to the first embodiment, the outside frame 7 includes the flexure frame 47 connected to the front end side of the flexure 45 and the beam frame 13 connected to the load beam 11. The flexure frame 47 and beam frame 13 are connected to each other at the overlapping area 69 where the frames 47 and 13 overlap each other when the flexure 45 and load beam 11 are positioned with respect to each other. Thereafter, the flexure frame 47 that is one of the flexure frame 47 and beam frame 13 is plastically deformed to correctly adjust the position of the tongue 49 with respect to the dimple 23.

The first embodiment effectively uses the flexure frame 47 and beam frame 13 to easily handle the flexure 45 and load beam 11 and precisely position the tongue 49 with respect to the dimple 23.

The flexure frame 47 includes the flexure frame arms 65a and 65b that extend on each side with respect to a longitudinal axis of the flexure 45 and are connected to the front end side of the flexure 45. The flexure frame arms 65a and 65b are plastically deformed to correctly adjust the position of the tongue 49 with respect to the position of the dimple 23.

This configuration allows the front end side of the flexure 45 to be correctly deformed to precisely position the tongue 49 with respect to the dimple 23.

The flexure frame 47 and beam frame 13 are provided with the reference holes 43, 71, 25, 55, 33, and 63. Into these reference holes, the positioning pins 73, 75, and 77 are inserted to position the flexure 45 and load beam 11 with respect to each other and keep the positioned state.

This technique easily positions the flexure 45 and load beam 11 with respect to each other, keeps the positioned state, and allows the position of the tongue 49 to be precisely adjusted to the position of the dimple 23.

The first embodiment temporarily joins the positioned flexure 45 and load beam 11 to each other at a location away from the front end side of the flexure 45 compared with the permanent welding spot W2.

This allows the front end side of the flexure 45 to be deformed to precisely position the tongue 49 with respect to the dimple 23 while accurately keeping the positioned state of the flexure 45 and load beam 11.

At the time of temporarily joining the flexure 45 and load beam 11 to each other, the flexure frame 47 and beam frame 13 can be joined to each other in the overlapping area 69.

This technique, even involving the temporary joining of the positioned flexure 45 and load beam 31, shortens a time, i.e., improve takt time for positioning the tongue 49 relative to the dimple 23 and producing the framed suspension 1.

The first embodiment as a method of manufacturing semi-finished head suspension carries out final or permanent welding on the flexure 45 and load beam 11, to provide the framed suspension 1 that includes the head suspension 9 and outside frame 7.

Namely, the first embodiment provides the framed suspension 1 on completion of the precise positioning of the tongue 49.

In the framed suspension 1, the tongue 49 of the flexure 45 is correctly positioned with respect to the dimple 23 of the load beam 11, and therefore, a slider to be attached to the flexure 45 is correctly positioned with respect to the dimple 23.

Figure 5:
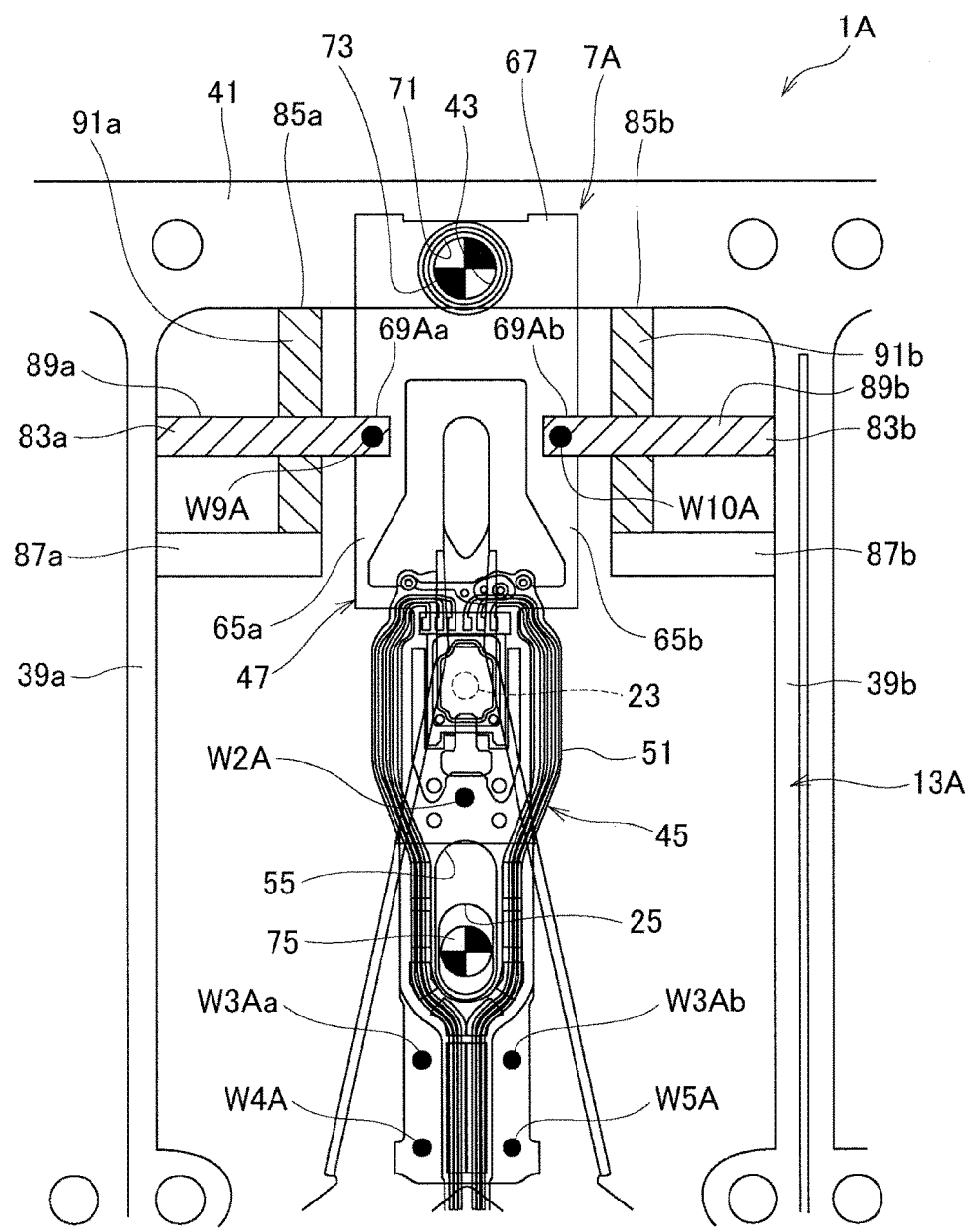
FIG. 5 is an enlarged view illustrating a deforming area of an outside frame of a half-finished head suspension according to a second embodiment of the present invention.

Accordingly, the framed suspension 1 according to the first embodiment is capable of providing the precision head suspension 9 when the outside frame 7 is cut from the framed suspension 1 and a slider is attached to the flexure 45, A second embodiment will be explained with reference to FIG. 5. FIG. 5 is an enlarged view illustrating a deforming area of an outside frame of a head suspension. The second embodiment is similar to the first embodiment, and therefore, like parts are represented with like reference numerals, or like reference numerals plus "A" to omit overlapping explanations.

The second embodiment provides the outside frame 7A with symmetrical lateral arms 83a and 83b and symmetrical longitudinal arms 85a and 85b. Hereinafter, the one lateral arm 83a and longitudinal arm 85a will be mainly explained and numerals of the other lateral arm 83b and longitudinal arm 85b and relevant structures thereof will be indicated in parentheses.

The lateral arms 83a and 83b extend in a width direction of a flexure 45. A first end of the lateral arm 83a (83b) is integral with one of a flexure frame 47 and a beam frame 13A. According to the second embodiment, the first end of the lateral arm 83a (83b) is integral with a beam frame side 39a (39b) of the beam frame 13A. A second end of the lateral arm 83a (83b) is laid on the other of the flexure frame 47 and beam frame 13A. According to the second embodiment, the second end of the lateral arm 83a (83b) is laid on a flexure frame arm 65a (65b) of the flexure frame 47. Accordingly, the lateral arms 83a and 83b form overlapping parts 69Aa and 69Ab on the flexure frame 47.

The longitudinal arms 85a and 85b extend in a longitudinal direction of the flexure 45. A first end of the longitudinal arm 85a (85b) is integrally connected to a beam frame front 41 of the beam frame 13A, an intermediate part thereof to the lateral arm 83a (83b), and a second end thereof to a reinforcing arm 87a (87b).

The reinforcing arm 87a (87b) extends in the width direction of the flexure 45. A first end of the reinforcing arm 87a (87b) is integrally connected to the longitudinal arm 85a (85b) and a second end thereof to the beam frame side 39a (39b) of the beam frame 13A.

The lateral arms 83a and 83b and longitudinal arms 85a and 85b define deforming areas 89a, 89b, 91a, and 91b, respectively, so that the lateral arms 83a and 83b and longitudinal arms 85a and 85b are deformed to separately adjust, the lateral and longitudinal positions of a tongue 49 relative to a dimple 23.

At this time, the flexure frame arms 65a and 65b of the flexure frame 47 may also be plastically deformed to adjust the position of the tongue 49.

The second embodiment provides effects similar to those of the first embodiment, in addition, the second embodiment can separately deform the lateral arms 83a and 83b and longitudinal arms 85a and 85b to separately adjust the lateral and longitudinal positions of the tongue 49. Accordingly, the second embodiment is capable of more precisely and flexibly adjusting the position of the tongue 49 with respect to the position of the dimple 23.

Figure 6:
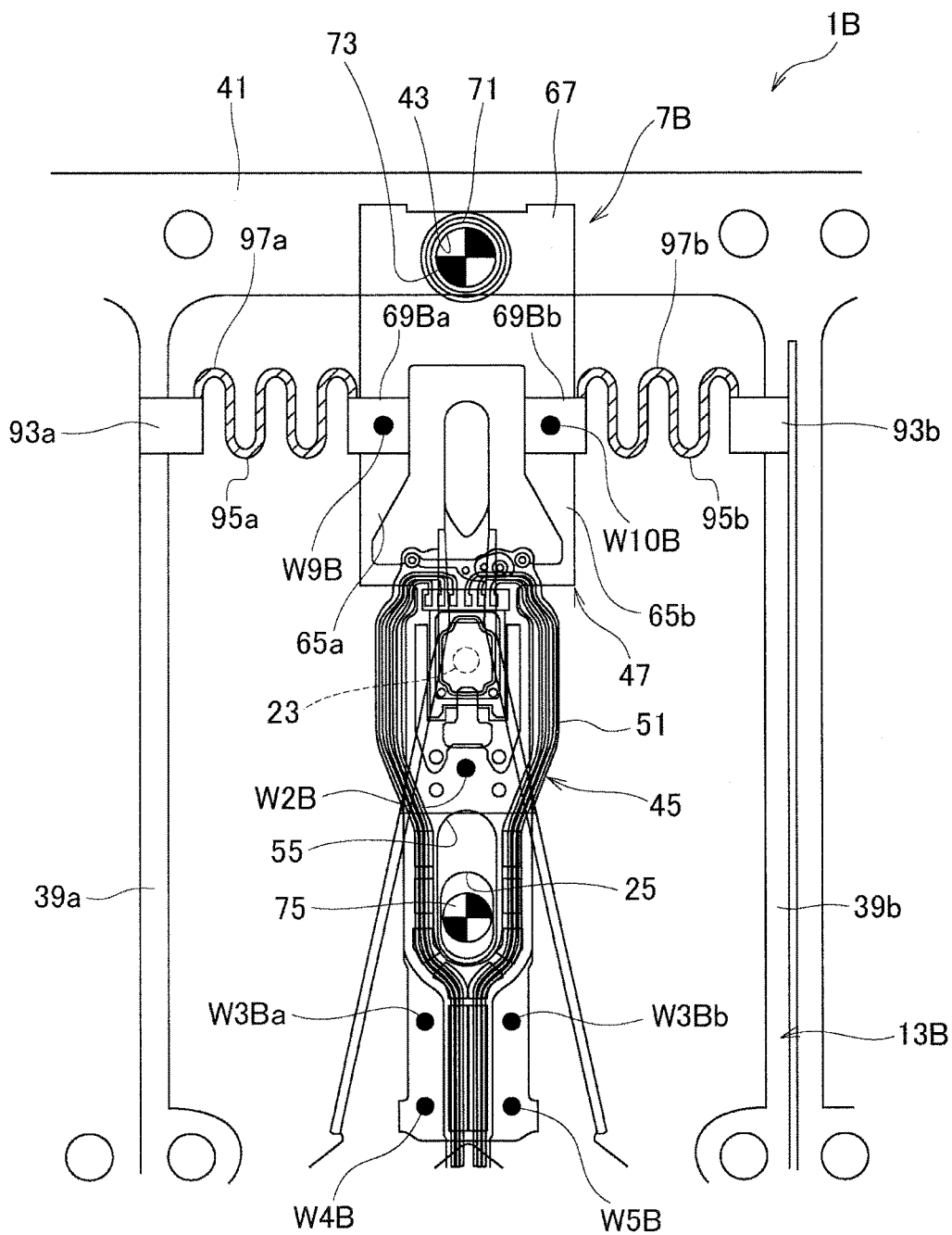
FIG. 6 is an enlarged view illustrating a deforming area of an outside frame of a half-finished head suspension according to a third embodiment of the present invention.

A third embodiment will be explained with reference to FIG. 6, FIG. 6 is an enlarged view illustrating a deforming area of an outside frame of a head suspension. The third embodiment is similar to the first embodiment, and therefore, like parts are represented with like reference numerals, or like reference numerals plus "B" to omit overlapping explanations.

The third embodiment provides an outside frame 7B with symmetrical wavy arms 93a and 93b.

The wavy arms 93a and 93b extend in a width direction of a flexure 45 and are waved so that the wavy arms replicate plural times in a direction orthogonal to an extending axis along the width direction of the flexure 45. The shape of the wave arms 93a and 93b are not particularly limited and may be sinusoidal, sawtooth, rectangular, trapezoidal, triangular, or the like. Hereinafter, the one wavy arm 93a will be mainly explained and numerals of the other wavy arm 93b and relevant structures thereof will be indicated in parentheses.

A first end of the wavy arm 93a (93b) is connected to one of a flexure frame 47 and a beam frame 3 3B. According to the third embodiment, the first end of the wavy arm 93a (93b) is integrally connected to a beam frame side 39a (39b) of the beam frame 13B. A second end of the wavy arm 93a (93b) is laid on the other of the flexure frame 47 and beam frame 13B. According to the third embodiment, the second end of the wavy arm 93a (93b) is laid on a flexure arm 65a (65b) of the flexure frame 47.

The wavy arm 93a (93b) has a wavy part 95a (95b) on which a deforming area 97a (97b) is defined. The wavy arras 93a and 93b are plastically deformed to correctly adjust the position of a tongue 49 with respect to a dimple 23.

At this time, the flexure frame arms 65a and 65b of the flexure frame 47 may also be plastically deformed to adjust the position of the tongue 49.

The third embodiment provides effects similar to those of the first embodiment.

In addition, the third embodiment is capable of buffering the influence of position adjustments of tongues 49 among adjacent head suspensions 9 that are chained in an outside frame 7B.

According to the embodiments mentioned above, the outside frame 7 (7A, 7B) includes the flexure frame 47 and beam frame 13 (13A, 13B). The present invention is also applicable to an outside frame without a beam frame, i.e., an outside frame connected only to the flexure 45.

For such an outside frame connected only to the flexure 45, the present invention plastically deforms the outside frame to correctly adjust the position of the tongue 49 of the flexure 45 like the above-mentioned embodiments.

What is claimed is:
1. A half-finished head suspension, comprising:
a flexure having a head attaching part defined at a front end for attaching a read/write head;
a load beam laid on and joined to the flexure and having a supporting part of a load beam positioned with respect to the head attaching part; and
an outside frame joined to a front end of the flexure,
wherein the outside frame includes a flexure frame and a beam frame, the flexure frame extends to only the front end of the flexure and is integrally connected only to the front end of the flexure and the beam frame is integrally connected to the load beam only at a base end of the load beam which base end is opposite to the front end of the flexure in a longitudinal direction of the flexure and the load beam, and the beam frame extends toward and partly overlaps the flexure frame, overlapping parts of the flexure frame and the beam frame being joined to each other through a welding spot spanning from the beam frame to the flexure frame,
wherein the joining between the load beam and the flexure comprises a permanent joining performed at a permanent joining spot, and a temporary joining performed at a location away from the front end of the flexure compared with the permanent joining spot, the permanent joining spot to be used to join the flexure and the load beam for permanent joining after the temporary joining to restrict the front end of the flexure from being bent, and
further wherein the outside frame defines a gap between the flexure frame and the beam frame on each side of the flexure frame in a width direction of the flexure frame, and wherein a bridging arm extends from the flexure frame to the beam frame across the gap on each side of the flexure frame.

2. The half-finished head suspension according to claim 1, wherein the flexure frame comprises flexure frame arms on both lateral sides of the front end of the flexure, the flexure frame arms including edges laterally-facing the flexure, respectively, and wherein a lateral distance between the edges of the flexure frame arms of the flexure frame gradually outwardly widens toward a connection between the flexure frame arms and the flexure.

3. The half-finished head suspension according to claim 1, wherein the bridging arm comprises a lateral arm that extends in the width direction of the flexure frame and a longitudinal arm which extends parallel to a longitudinal direction of the flexure frame.

4. The half-finished head suspension according to claim 1, wherein the bridging arm comprises a wavy arm that extends in the width direction and has a waved profile, wherein the wavy arm partly extends in a direction orthogonal to the width direction a plurality of times to form a repeating waved pattern.

* * * * *